G. L. WILLIS.
ANIMAL TRAP.
APPLICATION FILED FEB. 10, 1910.

986,256.

Patented Mar. 7, 1911.

2 SHEETS—SHEET 1.

Witnesses
Ernest Crocker
C. N. Woodward

Inventor
Guy L. Willis.

By Chandler & Chandler
Attorneys

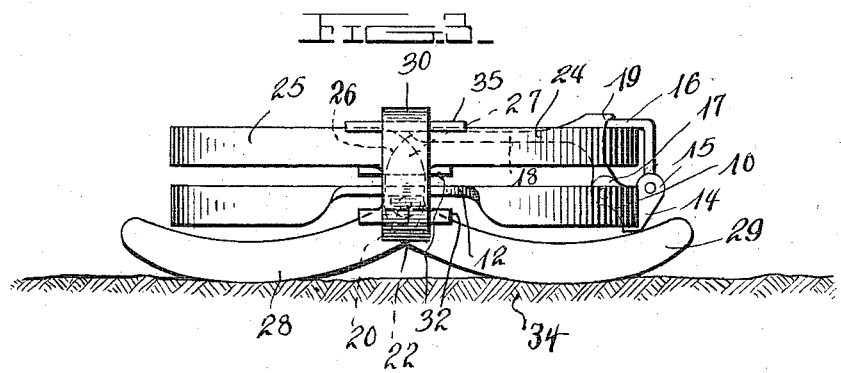
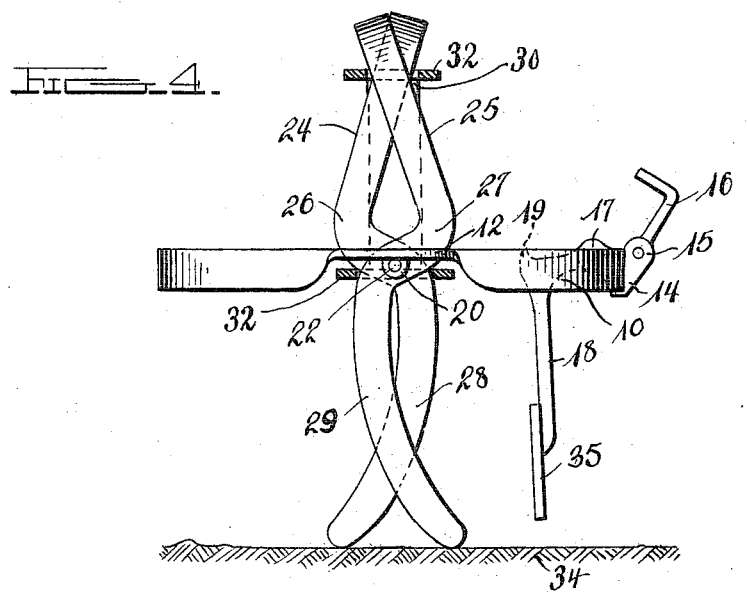
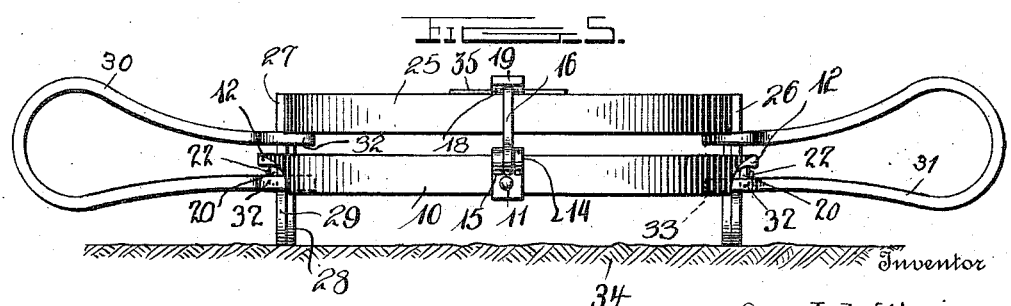

UNITED STATES PATENT OFFICE.

GUY L. WILLIS, OF THERMOPOLIS, WYOMING.

ANIMAL-TRAP.

986,256.

Specification of Letters Patent.

Patented Mar. 7, 1911.

Application filed February 10, 1910. Serial No. 543,081.

*To all whom it may concern:*

Be it known that I, GUY L. WILLIS, a citizen of the United States, residing at Thermopolis, in the county of Fremont, State of Wyoming, have invented certain new and useful Improvements in Animal-Traps; and I do hereby declare the following to be a full, clear, and exact description of the invention, such as will enable others skilled in the art to which it appertains to make and use the same.

This invention relates to improvements in animal traps, and has for one of its objects to provide a device of this character constructed wholly of metal of increased efficiency and utility, and so constructed that the trap is caused to suddenly spring upwardly when released, and thus grasp the leg or other portion of the animal at a point close to the body, and thus prevent any danger of the animal escaping from the trap.

Figure 1:
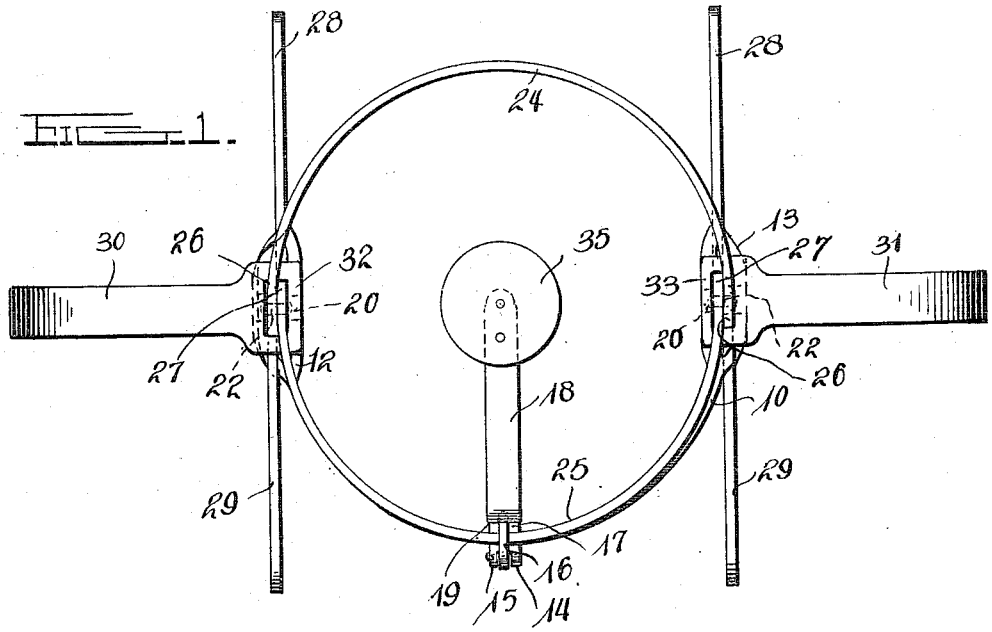
Figure 2:
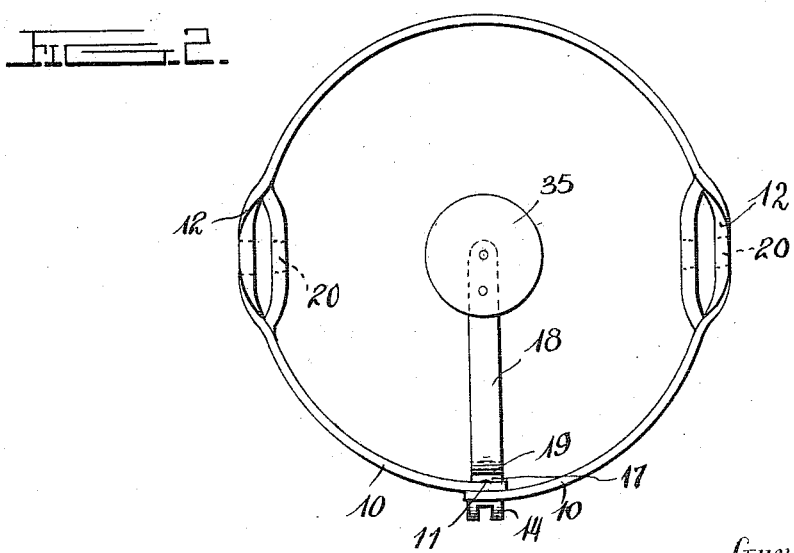

With this and other objects in view, the invention consists in certain novel features of construction as hereinafter shown and described and then specifically pointed out in the claims; and, in the drawings illustrative of the preferred embodiment of the invention, Figure 1 is a plan view of the improved trap in set position, Fig. 2 is a plan view of the base portion of the device with the jaws and the springs detached, Fig. 3 is a side elevation of the improved trap showing the parts in set position, Fig. 4 is a similar view showing the trap when in its sprung position, and partly in section, Fig. 5 is a rear elevation with the parts in set position, or as shown in Fig. 3.

The improved device comprises a base member formed from a single strip of metal, preferably flat transversely, and bent into hoop-like form with the ends overlapping and riveted together as shown at 11. The base member 10 is provided at two of its opposite sides with longitudinal clefts and the material of the band separated and twisted to form flat spaced bearing faces as shown in Fig. 2, at 12.

Connected to the band 10 at its overlapped portion is a U-shaped clamp member 14 which is secured to the base member by the same rivet 11 which secures the ends of the base member as shown in Figs. 2, 3 and 5. The clamp member 14 is provided with an external bearing 15 in which an L-shaped arm 16 is mounted to swing while the inner portion of the clip is provided with a similar bearing 17 in which a trigger arm 18 is mounted to swing. The trigger arm is provided with a slight offset or lug 19 beneath which the free end of the member 16 engages when the trigger arm is disposed in horizontal position as shown in Fig. 3. A bait pan 35 is connected to the arm 18 and is located preferably centrally of the base member 10 when the trap is in set position as shown in Figs. 1, 2 and 3.

The flattened portions 12 of the base member 10 are provided with suitable bearings formed in depending lips secured to the bifurcated portions 12 and here indicated at 20, and extending through these bearings are pins 22. Mounted to swing upon the pins 22 and extending through the space within the twisted portions 12 are two U-shaped jaws represented as a whole respectively at 24—25.

The jaws are provided intermediate their sides respectively with offsets 26—27 and pivoted upon the pins 22 at their offset portions. The remaining portions of the sides of the members 24—25 are extended in parallel relations as shown at 28—29, and likewise preferably curved, and extended in opposite directions when the jaws are in their lower positions as shown in Fig. 3. By providing the jaws 24—25 with the offsets the curved portions of the jaws lie above the base 10 when the trap is in its set position, while the extended portions 28—29 extend beneath the line of the base as shown in Fig. 3, and as hereinafter more fully described.

The springs employed upon the improved trap are represented respectively at 30—31, and each comprises a plate bent into U-shape and enlarged laterally at the ends as shown at 32—33, and apertured to bear around the jaws 24—25 at their offset portions.

When the trap is to be set the jaws 24—25 are depressed in opposite directions against the resistance of the springs 30—31 until the jaw 25 is located in position to be engaged by the member 16, which is passed over it and the trigger arm set with lug 19 engaging over the free end of the member 16. The jaws are thus locked in set position, as shown in Fig. 3, with the leg portions 28—29 bearing upon the ground indicated at 34. This arrangement locates the bait pan 35 centrally of the open space within the base 10 with the jaws 24—25 located above the base and conforming in outline therewith. This "sets" the trap and supports the trigger arm 18 with its bait pan centrally of the open space within the base 10 with the jaws 24—25 located directly above the base and conforming in outline therewith. By this means it will be noted that the entire space within the base 10 and the depressed jaws 24—25 is unobstructed except for the trigger member 18—35. This arrangement of the parts also disposes the feet 28—29 in their distended position and in engagement with the ground. When the animal places his foot upon the bait pan 35 and depresses the arm 18, this movement releases the lug 19 from engagement with the holding member 16 and releases the jaws, so that the springs 30—31 instantly elevate the jaws and at the same time depress the feet and cause the whole trap to suddenly spring upwardly and cause the jaws 24—25 to grasp the leg of the animal close to the body, and thus effectually trap the animal and insure a firm and rigid grip upon the leg.

The trigger member 18—35 it will be noted stands substantially horizontal and centrally of the open interior portion of the trap when the trap is set, as shown in Figs. 1, 3 and 5, and hangs vertically and at one side of the opening in the trap when the same is sprung, as shown in Fig. 4. By this means the interior of the trap is entirely open except for the limited area of the trigger which is automatically removed out of the way of the movement of the trap when the foot of the animal depresses it. The free and unobstructed open central portion of the trap is an important feature of the invention and materially increases the efficiency and utility of the trap, while the arrangement of the trigger whereby it is removed out of the way of the foot of the animal is also an important feature, as the presence of the trigger is thereby prevented from interfering with the free upward movement or "jumping" movement of the trap.

What is claimed is:—

1. A trap comprising a base having a relatively large interior opening, two jaw members swinging upon the base and conforming in outline thereto when depressed and arranged in superimposed relations to the base, each jaw member having a laterally directed leg adapted to bear upon the ground upon which the trap is located, springs operating to forcibly close said jaws, and a trigger for holding the jaws depressed and extending over the space within the base.

2. A trap comprising a base in band-like form and with clefts at two opposite sides with the material opposite the clefts spaced apart and in longitudinal position, two jaw members each formed of a U-shaped plate with sides spaced apart and conforming in outline, when combined, with the base, means for pivotally connecting said jaw members to said horizontal base portions, the portions of the jaws beyond the pivotal points constituting oppositely extending feet, springs operating to forcibly close said jaws, and a trigger for holding the jaws depressed and extending over the space within the base.

In testimony whereof, I affix my signature, in presence of two witnesses.

GUY L. WILLIS.

Witnesses:
L. J. DUHIG,
GEO. W. HIRARD.

---

Copies of this patent may be obtained for five cents each, by addressing the "Commissioner of Patents, Washington, D. C."